Sept. 4, 1923. 1,467,208
J. W. SUMNER
MOTOR VEHICLE STEERING APPARATUS
Filed Oct. 25, 1921 6 Sheets-Sheet 1

FIG. 1

WITNESS
A.E. Alberg

INVENTOR
JAMES W. SUMNER
BY
White Prost & Evans
his ATTORNEYS

Sept. 4, 1923. 1,467,208
J. W. SUMNER
MOTOR VEHICLE STEERING APPARATUS
Filed Oct. 25, 1921 6 Sheets-Sheet 3

WITNESS
A. E. Alberg

INVENTOR
JAMES W. SUMNER
BY
White Prost & Evans
his ATTORNEYS

Sept. 4, 1923.

J. W. SUMNER 1,467,208

MOTOR VEHICLE STEERING APPARATUS

Filed Oct. 25, 1921     6 Sheets-Sheet 5

WITNESS

INVENTOR
James W. Sumner
BY
White Prost & Evans
his ATTORNEYS

Patented Sept. 4, 1923.

1,467,208

UNITED STATES PATENT OFFICE.

JAMES WAYNE SUMNER, OF SAN FRANCISCO, CALIFORNIA, ASSIGNOR TO EMORY WINSHIP, OF SAN FRANCISCO, CALIFORNIA.

MOTOR-VEHICLE STEERING APPARATUS.

Application filed October 25, 1921. Serial No. 510,216.

*To all whom it may concern:*

Be it known that I, JAMES WAYNE SUMNER, a citizen of the United States, and a resident of the city and county of San Francisco, State of California, have invented a certain new and useful Motor-Vehicle Steering Apparatus, of which the following is a specification.

The invention relates to steering apparatus for motor driven vehicles, such as automobiles, trucks, tractors, boats and other heavy vehicles and relates particularly to a power operated steering mechanism.

An object of the invention is to provide a power operated steering mechanism which synchronizes with the steering wheel of the vehicle to cause the wheels or other steering device of the vehicle to move through an angle corresponding to the movement of the steering wheel.

Another object of the invention is to provide means for directly connecting the wheels or other steering device of the vehicle to the steering wheel in the event of failure of the power actuated mechanism or a part thereof.

A further object of the invention is to provide a hydraulically operated steering mechanism controlled by the steering wheel to turn the wheels or other steering device to the desired position and hold them in the selected position.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one embodiment of my invention, but it is to be understood that I do not limit myself to such form, since the invention, as set forth in the claims, may be embodied in a plurality of forms.

Referring to said drawings:—

The apparatus comprises a pump, driven by the engine or motor of the vehicle, for pumping liquid, preferably oil, to a motor, which is connected to the steering wheels or other steering devices. The motor is rotatable by the liquid under pressure, in either direction, depending upon the direction in which it is desired to steer the vehicle. The flow of liquid under pressure to the motor is controlled by a valve which is operably connected to the steering wheel, and which is also operably connected to the steering gear. Movement of the steering wheel opens the valve, thus causing operation of the motor, and movement of the steering gear causes the valve to close. Thus rotation of the steering wheel opens the valve causing an immediate movement of the steering gear which tends to close the valve, so that the angular displacement of the steering wheel is accompanied by a corresponding angular displacement of the wheels or other steering devices of the vehicles. Means are also provided for directly connecting the steering wheel to the steering gear and disconnecting the power actuated means in the event of the failure of the power actuated means, so that the vehicle may be steered directly by the force applied manually to the steering wheel. This means operates automatically when movement of the steering wheel is not accompanied by a concurrent movement of the steering gear.

Figure 1:
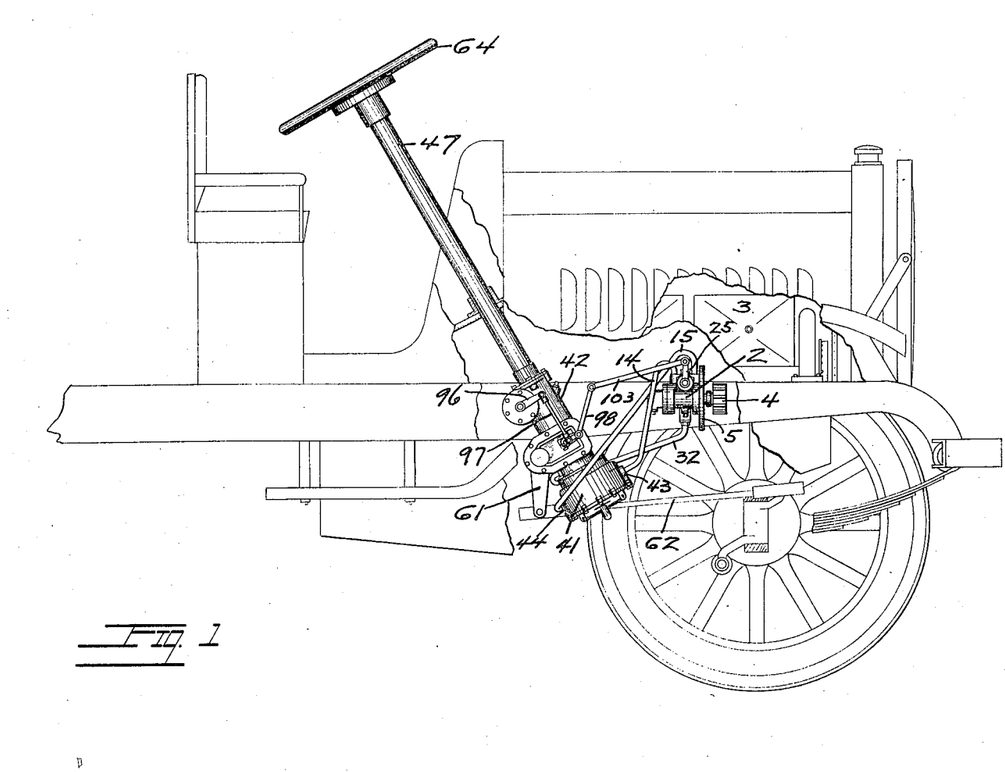
Figure 1 is an elevation of the steering apparatus arranged to control the direction of movement of an internal combustion engine driven vehicle.
Figures 2, 7:
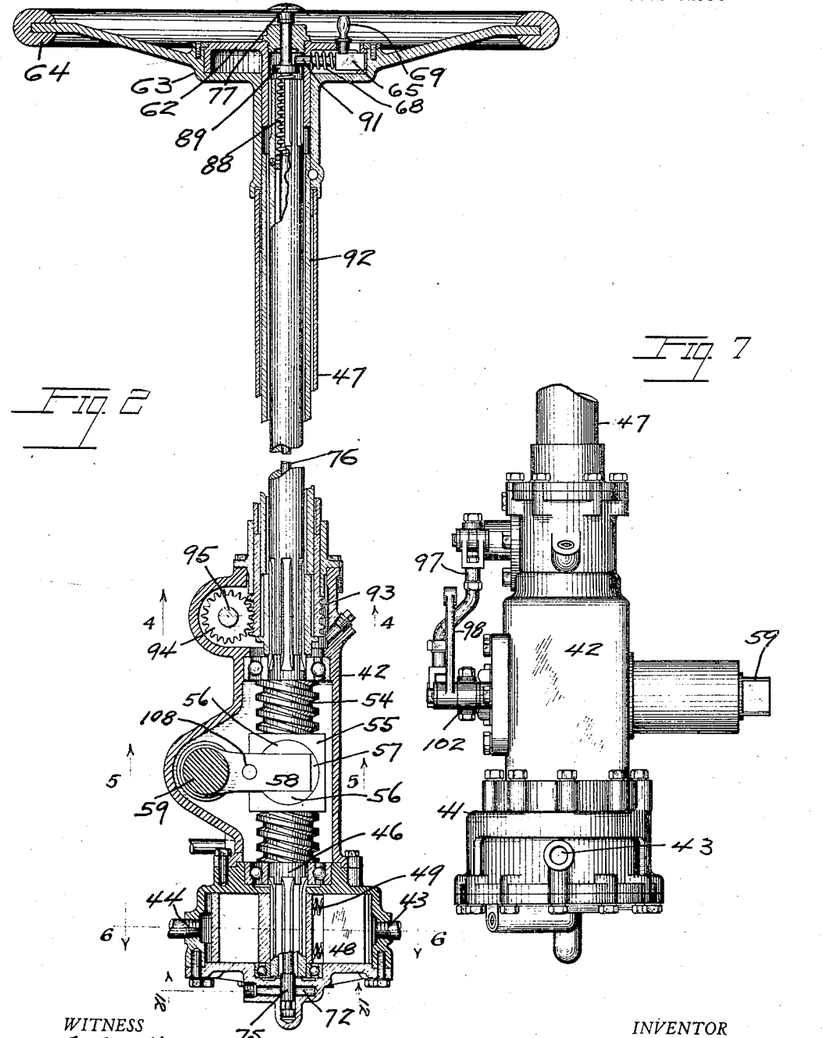
Fig. 2 is a longitudinal section through the steering apparatus, parts thereof being broken away to reduce the size of the figure.
Fig. 7 is a top or plan view of the lower portion of steering column.
Figure 3:
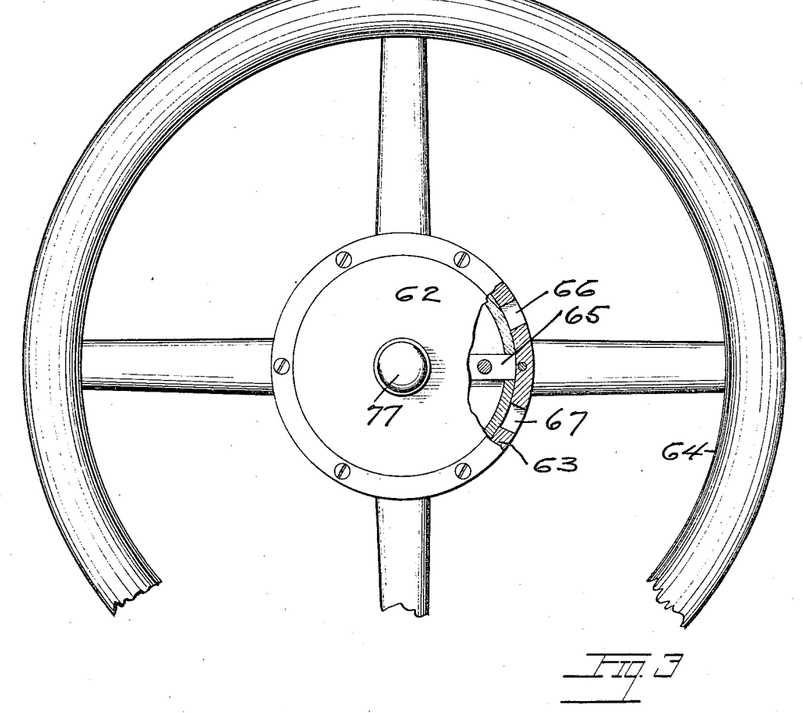
Fig. 3 is a plan view of the steering wheel of the vehicle.
Figure 4:
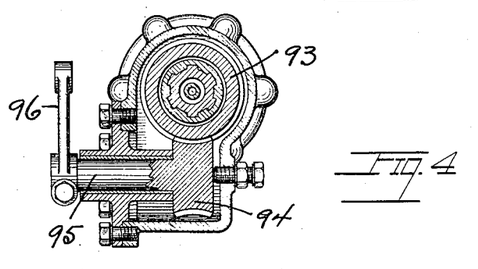
Fig. 4 is a section taken on the line 4—4, Fig. 2.
Figure 5:
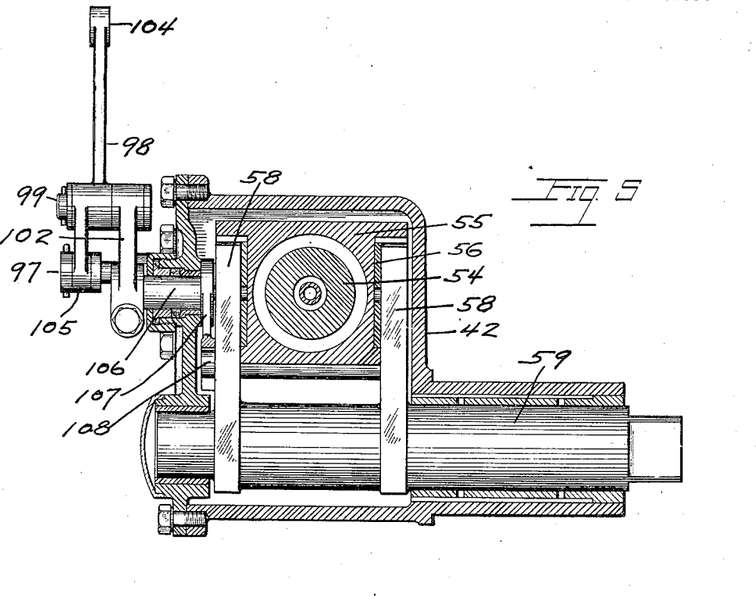
Fig. 5 is a section taken on the line 5—5, Fig. 2.
Figure 6:
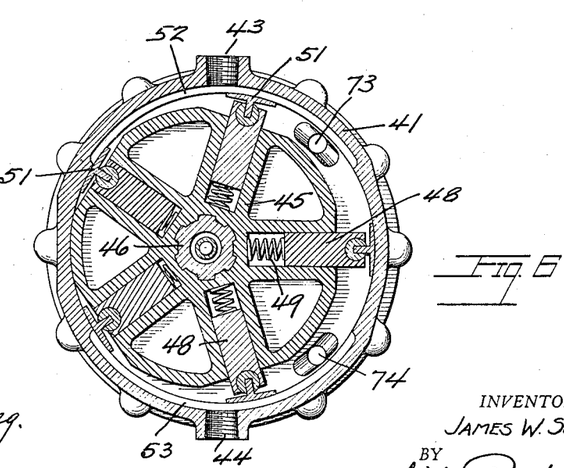
Fig. 6 is a section taken on the line 6—6, Fig. 2.
Figure 8:
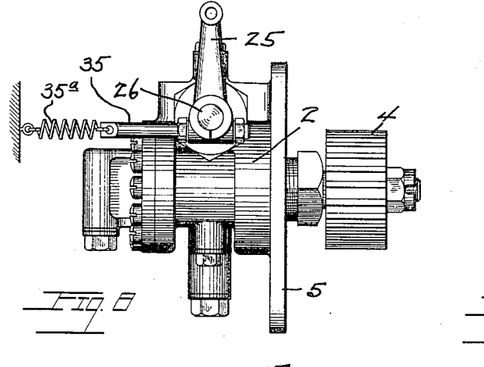
Fig. 8 is a side elevation of the pump.
Figure 9:
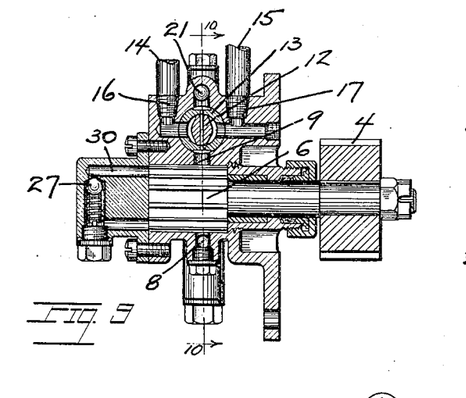
Fig. 9 is a longitudinal section through the pump taken on the line 9—9, Fig. 10.
Figure 10:
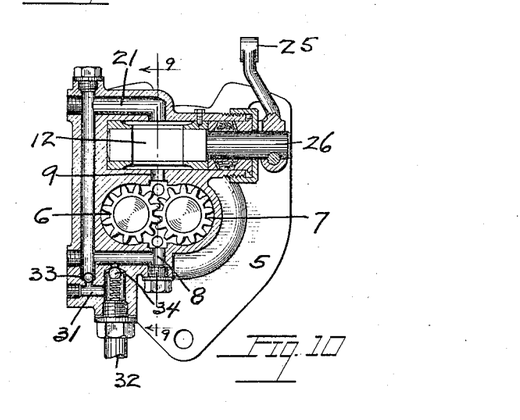
Fig. 10 is a cross section of the pump taken on the line 10—10, Fig. 9.

The actuating fluid, preferably oil, is placed under pressure by a pump 2, connected to the motor or engine 3, by a gear 4 on the pump shaft. The pump casing is provided with a flange 5, by which it is secured to a part of the motor or its associated devices. The pump shown in the drawings, is a gear pump, comprising the meshed gears 6 and 7 which normally rotate in a direction to carry the oil from the low pressure passage 8 to the high pressure passage 9. The flow of the oil from the high pressure passage 9 is controlled by a valve 12, arranged in the valve cage 13 in the pump casing, to cause the high pressure oil to flow to one side or the other of the hydraulic motor or to circulate within the pump, by flowing directly to the low pressure side. The pump is connected to the motor by two conduits 14—15 connecting the ports 16 and 17 of the pump with opposite sides of the motor, the flow of pressure fluid from the pump through one conduit causing the motor to rotate in one direction and the flow of pressure fluid from the pump through the other conduit causing the motor to rotate in the opposite direction. When the apparatus is operating to vary the direction of motion of the vehicle, the fluid flows from the pump to the motor through one conduit and flows back to the pump from the motor through the other conduit. The valve cage 13 is provided with an elongated slot 18 opening into the high pressure passage 9 and with a diametrically opposed elongated slot 19 opening into the passage 21 in the pump casing, which communicates with the low pressure passage 8. The valve cage is also provided with two diametrically opposed ports 22 and 23, preferably disposed at right angles to the slots 18 and 19 and these ports communicate respectively with the ports 16 and 17. Disposed in the valve cage is a rotatable valve 12 having a slot 24 extending transversely therethrough, and being of less width than the bore of the cage to provide passages in the cage in opposite sides of the valve, which passages communicate with the ports 22 and 23. When the apparatus is not operating to vary the direction of movement of the vehicle, the valve is positioned as shown in Figure 9, the slot 24 registering with the slots 18 and 19, so that the oil flows from the high pressure passage through the valve and the passage 21 to the low pressure passage 8. With the valve in this position, the ports 22 and 23 are closed, so that there is no flow of fluid to or from the motor.

Figure 11:
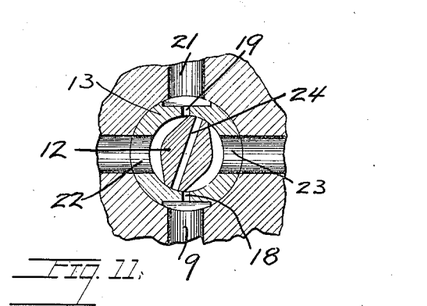
Fig. 11 is a detail showing the control valve of the pump open.
Figure 12:
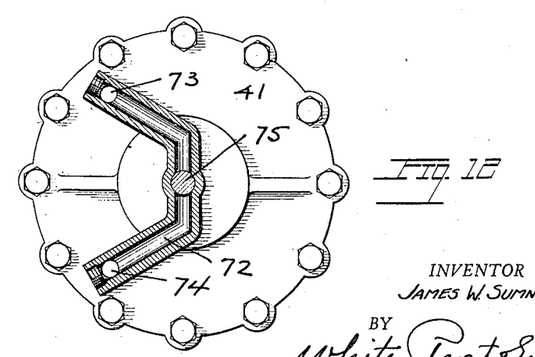
Fig. 12 is a section taken on the line 12—12, Fig. 2.
Figure 13:
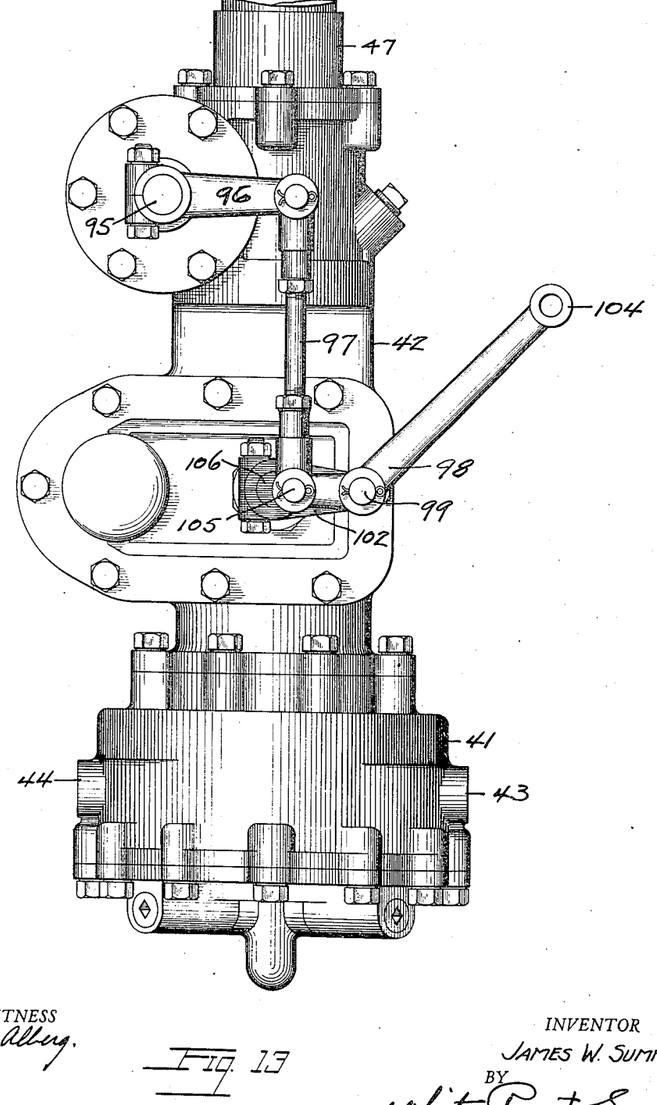
Fig. 13 is a side elevation of the lower portion of the steering column.

The valve is rotated slightly in either direction by a lever 25 secured to the valve shaft 26, to bring the high pressure passage 9 into communication with either of the ports 22 or 23 and the passage 21 into communication with either port 23 or 22. In Figure 11, I have shown the valve positioned to cause a flow of the fluid from the high pressure passage 9, through the slot 18 and ports 23 and 17 to the motor and a flow of the fluid from the motor through the ports 16 and 22, slot 19 and passage 21 to the low pressure passage 8. This causes rotation of the motor in one direction and movement of the valve to its opposed angular position will cause a reversal of the direction of the flow of fluid through the ports 16 and 17 and consequently, a reversal of the direction of rotation of the motor. The valve lever 25 is connected to the steering wheel of the vehicle, as will be hereinafter set forth.

Means are provided for preventing the production of an excessive pressure within the pump. Connecting the high and low pressure chambers 9 and 8, is a passage 30, having a spring loaded ball valve 27 therein, the compression of the spring 28 being sufficient to hold the valve 27 to its seat against normal pressure in the high pressure passage. Upon the production of abnormal pressure, the valve 27 is unseated and the fluid is by-passed through the passage 30. Means are also provided for replenishing the fluid supply in the circulating system in the event of wastage of fluid by leakage or otherwise so that the system is always fully charged with fluid and also for relieving any back pressure of the fluid due to a reversal of rotation of the pump which might be caused by back-firing of the engine, or otherwise. By-passing a portion of the passage 21, is a passage 31, which is connected by a conduit 32 with a fluid reservoir which will be hereafter described. One connection between the passages 21 and 31 is normally closed by a gravity held ball valve 33 which prevents the flow of fluid from passage 21 to passage 31, but permits the flow of fluid from passage 31 to passage 21 when the pressure of the fluid in the passage 21 falls below normal, such as will occur when there has been a leakage of fluid from the circulating system. The other connection between the passages 21 and 31 is controlled by a spring pressed ball valve 34, which prevents the flow of fluid from passage 31 to passage 21, but opens upon the existence of an excessive pressure in passage 21, to permit the fluid to vent into the passage 31 and back toward the reservoir.

The valve shaft 26 is provided with an arm 35, to which is connected a tension spring 35$^a$ disposed in alinement with the normal position of the arm 35, which tends to return the valve shaft to neutral position.

The motor, to which the conduits 14 and 15 are connected, comprises a casing 41 secured to the steering mechanism housing 42, and is provided with diametrically opposed ports 43 and 44 to which the conduits 14 and 15 are connected. The motor shown is of the rotary type and comprises a rotor 45 secured to the steering rod 46 which extends through the steering column 47. The motor casing encloses a cylindrical chamber disposed eccentrically with the axis of the steering rod 46, so that the rotor is eccentric to the motor casing. Arranged in the rotor are a plurality of radially disposed vanes 48 pressed outward radially by springs 49 seated behind them. On their outer ends, the vanes are provided with oscillatory shoes 51 engaging and forming a tight sliding joint with the surface of the motor chamber. As the rotor is rotated, the vanes slide radially therein, due to the eccentricity of the rotor, while maintaining tight sliding contact with the walls of the chambers. The cylindrical wall of the chamber is provided at each port 43—44 with an arcuate groove 52—53 through which the fluid by-passes around the vanes which are in contact therewith. Between the grooves the cylindrical wall is smooth so that the shoes 51 form a tight substantially leak proof joint therewith. The entrance of fluid under pressure through the port 43 rotates the rotor in a clockwise direction, expelling the fluid through the port 44, and the entrance of fluid under pressure through the port 44 rotates the rotor in a counter clockwise direction, expelling fluid through the port 43.

Formed integrally with the steering rod 46 is a worm 54 which is consequently rotated by the rotor 45 and engaging the worm is a nut 55 which is slidable longitudinally by rotation of the worm. Seated in opposite sides of the nut are rotatable blocks 56 having diametrically disposed slots 57 therein, in which the crank arms 58 of the steering gear shaft 59 are slidably disposed. Longitudinal movement of the nut therefore causes rotational movement of the shaft 59. The shaft 59 extends from the housing 42 and is provided on its projecting end with a steering arm 61, which is suitably connected to a drag-link 62 which is connected to the axle spindles of the road wheels or to other devices to be moved to steer the vehicle. The housing 42 in which the worm 54 is enclosed serves as a fluid reservoir and is connected to the pump by the conduit 32.

The steering rod 46, which is hollow, is secured at its upper end to the flanged disc 62 which is disposed centrally in the depressed hub 63 of the steering wheel 64. Normally the disc is in sliding engagement with the hub and is free to rotate slightly with respect thereto, but under certain conditions, such as failure of the motor to operate to turn the steering wheel, is locked to the disc, so that the vehicle is steered by power applied manually to the steering wheel. Disposed below the disc 62 and extending into an aperture in the flange thereof is a spring pressed plunger 65 which bears against the inner wall of the depressed hub 63. The disc normally rotates substantially synchronously with the hub, so that the plunger is in contact with a certain area of the inner wall of the depressed hub. On opposite sides of this area, the hub wall is provided with recesses 66—67 into either of which the plunger is forced by the spring 68 in the event that the disc does not rotate substantially synchronously with the hub. This locks the disc to the hub, so that the force applied to the steering wheel is directly effective to steer the vehicle. The plunger 65 is provided with a knob 69 extending through a radial slot in the disc, so that the plunger can be withdrawn from the hub when desired.

Since the rotor 45 is directly connected to the steering rod, rotation of the rod manually will be accompanied by rotation of the rotor, causing the expulsion from and admission to the motor casing of fluid, which, unless other provision is made, must pass through the pump, which is either impossible or impractical. In order to lessen as much as possible, the effort which must be applied to the steering wheel to steer the vehicle and to minimize the drag of the rotor, means are provided for by-passing the fluid, between the discharge and inlet sides of the rotor chamber. For this purpose the motor casing is provided with a passage 72 terminating at its ends in ports 73 and 74 opening into the rotor chamber in communication with the ports 43 and 44 respectively. This passage intersects the axis of the steering rod and is normally closed or obstructed by a plug 75 on the lower end of a rod 76 extending through the steering rod 46 and the disc 62 and being provided on its upper end with a button 77. This rod 76 is pressed upward by a spring 88 engaging a collar 89 thereon and is held from moving upward by the pin 91 on the plunger 65, which pin engages the upper surface of the collar 89. When the plunger springs into the hub however, to lock the disc and the hub, the pin is withdrawn from engagement with the collar and the rod 76 springs upward, removing the plug 75 from the passage 72 and permitting the fluid to readily by-pass from one side of the motor chamber to the other.

The steering wheel hub 63 is secured to the steering tube 92 disposed between the steering column casing 47 and the steering rod 46 and secured to the steering tube is a worm 93, which is meshed with a wormwheel 94 secured to the shaft 95 journalled in and extending from the steering mechanism housing 42. Secured to the extending portion of the shaft 95 is a crank 96 which is mediately connected to the valve crank 25, so that rotation of the steering wheel moves the control valve in the pump. The crank 96 is connected by the link 97 to the lever 98, fulcrumed intermediate its ends on the pin 99 carried by the crank 102 journalled in the steering mechanism housing. The free end of the lever 98 is connected to the valve crank 25 by the link 103. The pin 99 is movable in an arc to vary the position of the fulcrum of the lever 98, so that the upper or free end 104 of the lever may be moved while the lower end 105 to which the link 97 is attached, may remain stationary. The crank 102 is connected to the steering gear of the vehicle so that the position of the end 104 of the lever 98 and consequently of the control valve in the pump, is controlled by the position of the steering gear. In other words, the power controlling mechanism, for instance, the steering wheel, sets the control valve in position to actuate the mechanism to be moved and the movement of that mechanism, through the desired distance, moves the control valve back to neutral position.

The crank arm 102 is secured to a shaft 106 journaled in the steering mechanism housing, which shaft on its inner end carries a forked lever 107 which straddles a pin 108 on the crank arm 58. Therefore, as the crank arm 58, which is attached to the worm nut 55, moves angularly to vary the direction of motion of the vehicle, the shaft 106 is rocked, moving the fulcrum 99 of the lever 98 in an arc, with the crank 96 held stationary, movement of the fulcrum 99 is accompanied by movement of the free end 104 of the lever 98 back to neutral position. Assume that the steering wheel is rotated in a clockwise direction, to turn the vehicle to the right. This causes a clockwise movement of the crank 96 and a counter clockwise movement of the lever 98 about its fulcrum 99, moving the control valve of the pump in a direction to cause clockwise rotation of the rotor 45 and the worm 54. This causes a counter clockwise rotation of the shaft 59 which causes a clockwise rotation of the arm 102, moving the pivot pin 99 to the right and the lever 98 in a clockwise direction to bring the free end 104 thereof, back to neutral position. The motor therefore operates to rotate the shaft 59 substantially simultaneously with the rotation of the steering wheel and rotates said shaft through an angle corresponding to the degree of rotation of the steering wheel.

I claim:—

1. In a power steering mechanism for vehicles, a pair of coaxially arranged shafts, a motor directly connected to one of said shafts, a steering device operated by this shaft, means for manually operating the other shaft, a controller for the motor operated by said other shaft, and a connection between the controller and the motor shaft.

2. In a power steering mechanism for vehicles, a pair of coaxially arranged shafts, a motor directly connected to one of said shafts, a steering device operated by this shaft, means for manually operating the other shaft, and means whereby the operation of the motor is dependent upon the extent of relative movement between the two coaxial shafts.

3. In a power steering mechanism for vehicles, a pair of coaxially arranged shafts, a fluid pressure motor connected to one of said shafts, a steering device operated by this shaft, means for manually operating the other shaft, a valve for controlling the motor, said valve having a neutral position, and two other positions in response to which the motor may be rotated in either direction, and connections from the valve to both shafts, whereby the position of the valve is determined by the relative movement between the two shafts.

4. In a power steering mechanism for vehicles, a pair of coaxially arranged shafts, a motor connected to one of said shafts, a steering device operated by this shaft, means for manually operating the other shaft, and a controller for the motor operated by said other shaft.

5. In a power steering mechanism for vehicles, a pair of coaxially arranged shafts, a housing for the shafts, a steering hand wheel connected to one of the shafts at the top of the housing, a motor connected to the other shaft at the bottom of the housing, and a controller for the motor operated from the handwheel shaft.

6. In a power steering mechanism for vehicles, a motor, a steering mechanism operated by the motor, a controller for the motor, means for manually operating the controller, and means responsive to the failure of the motor to operate for connecting the manually operated means to the steering mechanism.

7. In a power steering mechanism for vehicles, a pair of coaxially arranged shafts, a motor for rotating one of said shafts, a steering mechanism operated by this shaft, means for manually rotating the other shaft, a controller for the motor operated by said other shaft, and means for clutching the two shafts together.

8. In a power steering mechanism for vehicles, a fluid pressure motor, a steering mechanism operated by the motor, means providing a by-pass for the motor, a valve for controlling the motor, means for manually operating the valve, and means responsive to the failure of the motor to operate for opening the by-pass.

9. In a power steering mechanism for vehicles, a fluid pressure motor, a steering shaft operated by the motor, a manually operated shaft coaxial with the steering shaft, a valve operated by said manually operated shaft, means providing a by-pass for the motor, a rod extending through both shafts for opening and closing the by-pass, a clutch between the two shafts, and a common means for operating the rod and the clutch.

10. In a vehicle steering apparatus, a movable device for varying the direction of movement of the vehicle, a steering rod connected to said device, hydraulically operated means for rotating said steering rod, mechanism for controlling the operation of said hydraulically operated means, a steering wheel connected to said controlling mechanism and normally disconnected from said steering rod and means operative upon a predetermined degree of rotation of the steering wheel with respect to the steering rod for directly connecting said wheel and rod.

11. In a vehicle steering apparatus, a movable device for varying the direction of movement of the vehicle, a steering rod connected to said device, hydraulically operated means for rotating said steering rod, mechanism for controlling the operation of said hydraulically operated means, a steering wheel connected to said controlling mechanism and normally disconnected from said steering rod and means responsive to the failure of said hydraulically operated means for directly connecting the steering rod and the steering wheel.

12. In a vehicle steering apparatus, a movable device for varying the direction of movement of the vehicle, a steering rod connected to said device, hydraulically operated means for rotating said steering rod, mechanism for controlling the operation of said hydraulically operated means, a steering wheel connected to said controlling mechanism and normally disconnected from said steering rod and means for directly connecting the steering rod and steering wheel and by-passing the fluid in the hydraulically operated means.

13. In a vehicle steering apparatus, a movable device for varying the direction of movement of the vehicle, a steering rod connected to said device, hydraulically operated means for rotating said steering rod, mechanism for controlling the operation of said hydraulically operated means, a steering wheel connected to said controlling mechanism and normally disconnected from said steering rod and means operative upon a predetermined degree of rotation of the steering wheel with respect to the steering rod for directly connecting the steering rod and the steering wheel and means operative simultaneously for operatively disconnecting the hydraulically operated means from the steering rod.

14. In a vehicle steering apparatus, a movable device engaging the surface over which the vehicle travels for varying the direction of motion of the vehicle, a steering rod connected to said device, a hydraulic motor connected to said steering rod, fluid outlet and inlet conduits connected to opposite sides of said motor, means for controlling the flow of fluid through said conduits, a steering wheel connected to said controlling means and means operative upon a predetermined degree of rotation of the steering wheel with respect to said steering rod for directly connecting the opposite sides of said motor.

15. In a vehicle steering apparatus, a movable device for varying the direction of movement of the vehicle, a steering rod connected to said device, a hydraulic motor connected to said steering rod, fluid outlet and inlet conduits connected to opposite sides of said motor, means for controlling the flow of fluid through said conduits, a steering wheel connected to said controlling means and normally disconnected from said steering rod and means operative upon a predetermined degree of rotation of the steering wheel with respect to the steering rod for directly connecting said wheel and rod and by-passing the fluid between the opposite sides of the motor.

16. In a vehicle steering apparatus, a movable device engaging the surface over which the vehicle travels for varying the direction of motion of the vehicle, a steering rod connected to said device, a hydraulic motor connected to said steering rod, fluid inlet and outlet conduits connected to opposite sides of said motor, a conduit directly connecting the opposite sides of the motor, a normally closed valve in said latter conduit, means for controlling the flow of fluid through said outlet and inlet conduits, a steering wheel connected to said controlling means and means operative upon a predetermined degree of rotation of the steering wheel with respect to the steering rod for opening said valve.

17. In a vehicle steering apparatus, a movable device for varying the direction of movement of the vehicle, a steering rod connected to said device, a hydraulic motor connected to said steering rod, fluid inlet and outlet conduits connected to opposite sides of said motor, a conduit directly connecting the opposite sides of the motor, a normally closed valve in said latter conduit, means for controlling the flow of fluid through said outlet and inlet conduits, a steering wheel connected to said controlling means and means operative upon a predetermined degree of rotation of the steering wheel with respect to the steering rod for directly connecting the steering wheel and the steering rod and opening said valve.

18. In a vehicle steering apparatus, a movable device engaging the surface over which the vehicle travels for varying the direction of motion of the vehicle, a steering rod, a worm on said rod, a nut on said worm, a shaft connected to said device and having arms engaging said nut, a hydraulic motor connected to said steering rod, a pump for providing fluid under pressure, a conduit connecting said pump and said motor, a valve for controlling the flow of fluid under pressure through said conduit, a steering wheel, mechanism connecting said steering wheel and said valve whereby rotation of the wheel opens the valve to permit the flow of pressure fluid to the motor to rotate said steering rod and means operative by the rotation of said rod for moving said connecting mechanism to close said valve.

19. In a vehicle steering apparatus, a movable device engaging the surface over which the vehicle travels for varying the direction of motion of the vehicle, a steering rod, steering gear connecting the steering rod with said device whereby rotation of the rod moves the device to vary the direction of motion of the vehicle, a hydraulic motor connected to the steering rod and serving to rotate the same, a conduit for supplying fluid under pressure to said motor, a valve normally closing said conduit, a steering wheel, means including a lever fulcrumed intermediate its ends connecting said steering wheel and said valve whereby rotation of said wheel moves said valve to open said conduit and means connecting said fulcrum and said steering gear whereby movement of the steering gear moves said fulcrum in a direction to close said valve.

In testimony whereof, I have hereunto set my hand.

JAMES WAYNE SUMNER